United States Patent
Song et al.

(10) Patent No.: US 8,166,052 B2
(45) Date of Patent: Apr. 24, 2012

(54) SITUATION RECOGNITION FOR RECOMMENDATION USING MERGE-SPLIT APPROACH

(75) Inventors: Yu Song, Pleasanton, CA (US); Sangoh Jeong, Palo Alto, CA (US); Doreen Cheng, San Jose, CA (US); Swaroop Kalasapur, Sunnyvale, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 555 days.

(21) Appl. No.: 12/104,086

(22) Filed: Apr. 16, 2008

(65) Prior Publication Data

US 2009/0106304 A1 Apr. 23, 2009

Related U.S. Application Data

(63) Continuation-in-part of application No. 12/099,716, filed on Apr. 8, 2008.

(60) Provisional application No. 61/033,315, filed on Mar. 3, 2008, provisional application No. 60/981,812, filed on Oct. 22, 2007.

(51) Int. Cl.
*G06F 17/30* (2006.01)
(52) U.S. Cl. ................................ 707/751
(58) Field of Classification Search ........... 707/737, 707/749, 751
See application file for complete search history.

(56) References Cited

U.S. PATENT DOCUMENTS

| | | | |
|---|---|---|---|
| 6,848,104 B1 * | 1/2005 | Van Ee et al. | 719/310 |
| 7,039,638 B2 | 5/2006 | Zhang et al. | |
| 7,096,219 B1 | 8/2006 | Karch | |
| 7,174,343 B2 * | 2/2007 | Campos et al. | 707/737 |
| 7,461,061 B2 * | 12/2008 | Aravamudan et al. | 1/1 |
| 7,461,073 B2 * | 12/2008 | Gao et al. | 1/1 |
| 7,664,718 B2 * | 2/2010 | Acharya et al. | 706/45 |
| 7,689,585 B2 | 3/2010 | Zeng et al. | |
| 7,792,770 B1 | 9/2010 | Phoha et al. | |
| 2003/0172063 A1 | 9/2003 | Gutta et al. | |
| 2003/0224344 A1 * | 12/2003 | Shamir et al. | 435/4 |
| 2004/0073918 A1 | 4/2004 | Ferman et al. | |
| 2005/0234972 A1 * | 10/2005 | Zeng et al. | 707/103 R |
| 2007/0271266 A1 * | 11/2007 | Acharya et al. | 707/6 |
| 2007/0271287 A1 * | 11/2007 | Acharya et al. | 707/101 |
| 2008/0077575 A1 | 3/2008 | Tateno et al. | |
| 2008/0120287 A1 | 5/2008 | Guan et al. | |

OTHER PUBLICATIONS

John A. Flanagan, "Unsupervised Clustering of Context Data and Learning User Requirements for a Mobile-Device", 5th Int'l and Interdisp. Conf. on Modeling and Using Context (Context-05), pp. 155-168, 2005.

(Continued)

*Primary Examiner* — James Trujillo
*Assistant Examiner* — Jorge A Casanova
(74) *Attorney, Agent, or Firm* — Beyer Law Group LLP (57) ABSTRACT

In one embodiment, data relating to usage patterns of the user is stored, wherein the data includes information as to items which were used and the context in which they were used. The data is then clustered into input clusters of data points. It is determined if there are any input clusters that are similar to each other. Similar clusters are merged if there are any input clusters similar to each other. Any non-merged input clusters are divided into split clusters if the split clusters would not be similar to each other. The determining, merging, and dividing are then repeated using the merged, divided, and remaining unmerged and undivided clusters as input clusters.

19 Claims, 8 Drawing Sheets

OTHER PUBLICATIONS

J. B. MacQueen, "Some Methods for Classification and Analysis of Multivariate Observations", Proceedings of 5th Berkeley Symposium on Mathematical Statistics and Probability, Berkeley, University of California Press, pp. 281-297, 1967.

Hyuk Cho et al., "Minimum Sum-Squared Residue Co-clustering of Gene Expression Data", Proceedings of the Fourth SIAM International Conference on Data Mining (SDM), pp. 114-125, Apr. 2004.

Allen Gersho et al., "Random Processes and Linear Systems" (Chapter 2), pp. 19-47, Vector Quantization and Signal Compression, 1992, Kluwer Academic Publishers, Second Printing, 1993.

Allen Gersho et al., "Sampling" (Chapter 3), pp. 51-81, Vector Quantization and Signal Compression, 1992, Kluwer Academic Publishers, Second Printing, 1993.

Allen Gersho et al., "Linear Prediction" (Chapter 4), pp. 85-129, Vector Quantization and Signal Compression, 1992, Kluwer Academic Publishers, Second Printing, 1993.

S.C. Madeira, A. L. Oliveira, "Biclustering Algorithms for Biological Data Analysis: A Survey," IEEE Transactions on Computational Biology and Bioinformatics, vol. 1, Issue 1, pp. 24-45, 2004.

Chen et al., "A Survey of Context-Aware Mobile Computing Research," Dartmouth Computer Science Technical Report TR2000-381, Dartmouth College, 2000.

Deshpande et al., "*Item-Based Top-N Recommendation Algorithms*," ACM Transactions on Information Systems, vol. 22, No. 1, Jan. 2004, pp. 143-177.

Office Action in U.S. Appl. No. 12/137,417, mailed Aug. 2, 2010.

Herlocker et al., "*An Algorithm Framework for Performing Collaborative Filtering*," In Proc. of SIGIR 1999.

Office Action in U.S. Appl. No. 12/099,716, mailed Sep. 30, 2010.

Equitz, A New Vector Quantization Clustering Algorithim, 1989, IEEE, 1568-1575.

Kollios, et al., "Efficient Biased Sampling for Approximate Clustering and Outlier Detection in Large Data Sets," Sep.-Oct. 2003, IEEE, vol. 15, 1170-1187.

Final Office Action dated Feb. 3, 2011 from U.S. Appl. No. 12/099,716.

Notice of Allowance dated May 13, 2011 from U.S. Appl. No. 12/099,716.

Wang et al., Scalable sequential pattern mining for biological sequences, Nov. 2004, ACM, 178-187.

Notice of Allowance dated Nov. 21, 2011 from U.S. Appl. No. 12/137,417.

Ricci et al. "*Acquiring And Revising Preferences In A Critique-Based Mobile Recommender System.*" Journal IEEE Intelligent Systems, vol. 22 Issue 3, May 2007.

Office Action in U.S. Appl. No. 12/137,417, mailed Nov. 10, 2010.

Office Action in U.S. Appl. No. 12/104,086, mailed Nov. 8, 2010.

\* cited by examiner

SITUATION RECOGNITION FOR RECOMMENDATION USING MERGE-SPLIT APPROACH

CROSS-RELATION TO RELATED APPLICATION

This application is a continuation-in-part of U.S. patent application Ser. No. 12/099,716, entitled "SITUATION AWARE RECOMMENDATION USING LIMITED CLUSTER SIZES," by Yu Song, Sangoh Jeong, Doreen Cheng, and Swaroop Kalasapur, filed Apr. 8, 2008, which is based on provisional patent application Ser. No. 61/033,315, entitled "SITUATION-AWARE TASK RECOMMENDATION FOR MOBILE DEVICES," by Doreen Cheng, Yu Song, Hyuk Cho, Sangoh Jeong, Swaroop Kalasapur, and Alan Messer, filed Mar. 3, 2008 and provisional patent application Ser. No. 60/981,812, entitled "SITUATION-AWARE RECOMMENDATION FOR COMPUTING SYSTEMS," by Yu Song, Doreen Cheng, Swaroop Kalasapur, and Dongyun Jin, filed Oct. 22, 2007, all of which are herein incorporated by reference in their entireties.

BACKGROUND OF THE INVENTION

1. Field of the Invention

The present invention relates to situation recognition. More particularly, the present invention relates to situation recognition for recommendations using a merge-split approach.

2. Description of the Related Art

Conceptually, a computing system (e.g., a computing device, a personal computer, a laptop, a Smartphone, a mobile phone) can accept information (content or data) and manipulate it to obtain or determine a result based on a sequence of instructions (or a computer program) that effectively describes how to process the information. Typically, the information used by a computing system is stored in a computer readable memory using a digital or binary form. More complex computing systems can store content including the computer program itself. A computer program may be invariable and/or built into, for example a computer (or computing) device as logic circuitry provided on microprocessors or computer chips. Today, general purpose computers can have both kinds of programming. A computing system can also have a support system which, among other things, manages various resources (e.g., memory, peripheral devices) and services (e.g., basic functions such as opening files) and allows the resources to be shared among multiple programs. One such support system is generally known as an Operating System (OS) which provides programmers with an interface used to access these resources and services.

Today, numerous types of computing devices are available. These computing devices widely range with respect to size, cost, amount of storage and processing power, from the expensive and powerful servers, relatively cheaper Personal Computers (PC's) and laptops, to more inexpensive microprocessors or computer chips provided in storage devices, automobiles, and household electronic appliances.

In recent years, computing systems have become more portable and mobile. As a result, various mobile and handheld devices have been made available. By way of example, wireless phones, media players, Personal Digital Assistants (PDA's) are widely used today. Generally, a mobile or a handheld device (also known as handheld computer or simply handheld) can be a pocket-sized computing device, typically utilizing a small visual display screen for user output and a miniaturized keyboard for user input. In the case of a Personal Digital Assistant (PDA), the input and output can be combined into a touch-screen interface.

In particular, mobile communication devices (e.g., mobile phones) have become extremely popular. Some mobile communication devices (e.g., Smartphones) offer computing environments that are similar to that provided by a Personal Computer (PC). As such, a Smartphone can effectively provide a complete operating system as a standardized interface and platform for application developers. Given the popularity of mobile communication devices, telecommunication is discussed in greater detail below.

Generally, a mobile phone or cell phone can be a long-range, portable electronic device used for mobile communication. In addition to the standard voice function of a telephone, current mobile phones can support many additional services such as SMS for text messaging, email, packet switching for access to the Internet, and Multimedia Messaging Service (MMS) for sending and receiving photos and video. Most current mobile phones connect to a cellular network of base stations (cell sites), which is in turn interconnected to the public switched telephone network (PSTN) (one exception is satellite phones).

The Short Message Service (SMS), often called text messaging, is a means of sending short messages to and from mobile phones. SMS was originally defined as part of the GSM series of standards in 1985 as a means of sending messages of up to 160 characters, to and from Global System for Mobile communications (GSM) mobile handsets. Since then, support for the service has expanded to include alternative mobile standards such as ANSI CDMA networks and Digital AMPS, satellite and landline networks. Most SMS messages are mobile-to-mobile text messages, though the standard supports other types of broadcast messaging as well. The term SMS is frequently used in a non-technical sense to refer to the text messages themselves, particularly in non-English-speaking European countries where the GSM system is well-established.

Multimedia Messaging Service (MMS) is a relatively more modern standard for telephony messaging systems that allows sending messages that include multimedia objects (images, audio, video, rich text) and not just text as in Short Message Service (SMS). It can be deployed in cellular networks along with other messaging systems like SMS, Mobile Instant Messaging and Mobile E-mail. Its main standardization effort is done by 3GPP, 3GPP2 and Open Mobile Alliance (OMA).

There are many circumstances in which it would be beneficial for a computer or other electronic device to be able to recommend software applications or other items for a user to download, install, and/or utilize in other ways. Once such circumstance is where the user is operating a mobile device. The display and interface limitations of such devices make it difficult for users to perform significant searching for applications using them. For example, a user may be shopping and desire to utilize a price comparison software application on his mobile device. However, it would be difficult for the user to navigate the Internet and/or a directory of available software applications using the mobile device. In such cases, it would be beneficial to recommend to the user a small set of software applications.

SUMMARY OF THE INVENTION

In one embodiment, data relating to usage patterns of the user is stored, wherein the data includes information as to items which were used and the context in which they were used. The data is then clustered into input clusters of data points. It is determined if there are any input clusters that are similar to each other. Similar clusters are merged if there are any input clusters similar to each other. Any non-merged input clusters are divided into split clusters if the split clusters would not be similar to each other. The determining, merging, and dividing are then repeated using the merged, divided, and remaining unmerged and undivided clusters as input clusters.

In another embodiment, an apparatus is provided comprising: an interface; and one or more processors configured to: store data relating to usage patterns of the user, wherein the data includes information as to items which were used and the context in which they were used; cluster the data into input clusters of data points; determine if there are any input clusters that are similar to each other; merge the similar clusters if there are any input clusters similar to each other: divide any non-merged input clusters into split clusters if the split clusters would not be similar to each other; and repeat the determining, merging, and dividing using the merged, divided, and remaining unmerged and undivided clusters as input clusters.

In another embodiment, a system is provided for making recommendations to a user, the system comprising: means for storing data relating to usage patterns of the user, wherein the data includes information as to items which were used and the context in which they were used; means for clustering the data into input clusters of data points; means for determining if there are any input clusters that are similar to each other; means for merging the similar clusters if there are any input clusters similar to each other: means for dividing any non-merged input clusters into split clusters if the split clusters would not be similar to each other; and means for repeating the determining, merging, and dividing using the merged, divided, and remaining unmerged and undivided clusters as input clusters.

In another embodiment, a program storage device readable by a machine tangibly embodying a program of instructions executable by the machine is provided to perform a method for making recommendations to a user, the method comprising: storing data relating to usage patterns of the user, wherein the data includes information as to items which were used and the context in which they were used; clustering the data into input clusters of data points; determining if there are any input clusters that are similar to each other; merging the similar clusters if there are any input clusters similar to each other: dividing any non-merged input clusters into split clusters if the split clusters would not be similar to each other; and repeating the determining, merging, and dividing using the merged, divided, and remaining unmerged and undivided clusters as input clusters.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

In an embodiment of the present invention, software applications or other items may be automatically recommended to the user based on data related to the current context and past usage information. Context refers to the situation in which the user and/or device the user is operating. For example, the context may include the location of the user—whether the user is home, at the office, or elsewhere. The context may also include the time of day—for example, whether it is morning, afternoon, or evening. One of ordinary skill in the art will recognize that there may be many other types of information captured by the context and nothing in this document shall be read as limiting the invention to any particular type of information.

One way for a system to provide software recommendations would be to let a user specify his or her preferences, and use the preferences to guide application/service recommendations. For example, a user may indicate a preference for business-related software, and the system may use this information to err on the side of recommending business-related software applications. Thus, for example, if the choice is between a game application and a word processing application, the system would recommend a word processing application. This solution, however, suffers from the drawback that user studies have shown that few users would bother to specify preferences, as such there is simply no data from which to extract such a recommendation. Furthermore, even when preferences are specified, user preferences are usually situation-dependent, i.e., a user's preferences vary from situation to situation. For example, while a user may have a preference for business-related software while at work or during the daytime, the same user may have a preference for entertainment-related software while at home. In another example, at evening at home on a rainy day, the user may want to cook dinner and watch news, and may prefer software applications related to those tasks, while at a similar time at the office and in a meeting, the user may want to call home and arrange for food to be picked up on the way home. The preference-based approach to recommendations, used alone, simply does not provide the level of granularity needed to be effective for real-world uses.

Other approaches require the user to effectively train the device over a period of time ("supervised training"). However, supervised training may not be an ideal or a desired solution for many applications as it requires the use to spend a significant amount of time and effort to actively train the device. Another drawback is that conventional approaches are not flexible and do not readily adapt to changes in preferences, environment, or habits associated with the use of the device. Therefore, improved techniques for enhancing mobile devices and/or their use are needed.

Figure 1:
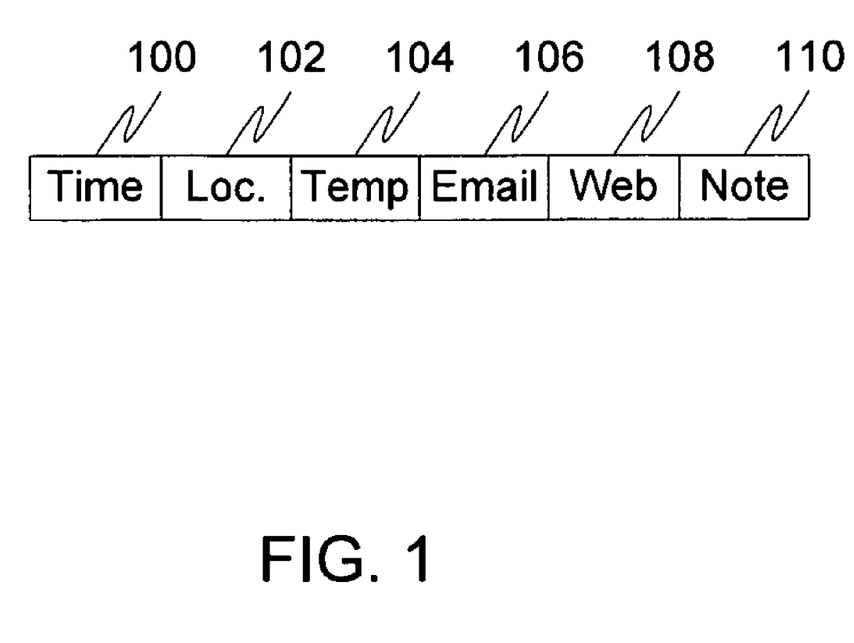
FIG. 1 is a diagram illustrating an example vector storing context and usage information for a single data point.

As such, in an embodiment of the present invention, context information is captured and utilized in the application-recommending process. Data relating to previous usage information may be collected and stored as data points. The data point information may be stored in vectors. FIG. 1 is a diagram illustrating an example vector storing context and usage information for a single data point. In this example, context information includes time 100, location 102, and temperature 104. Usage information indicates which applications the user operated, including email 106, web browsing 108, and notepad 110.

Figure 2:
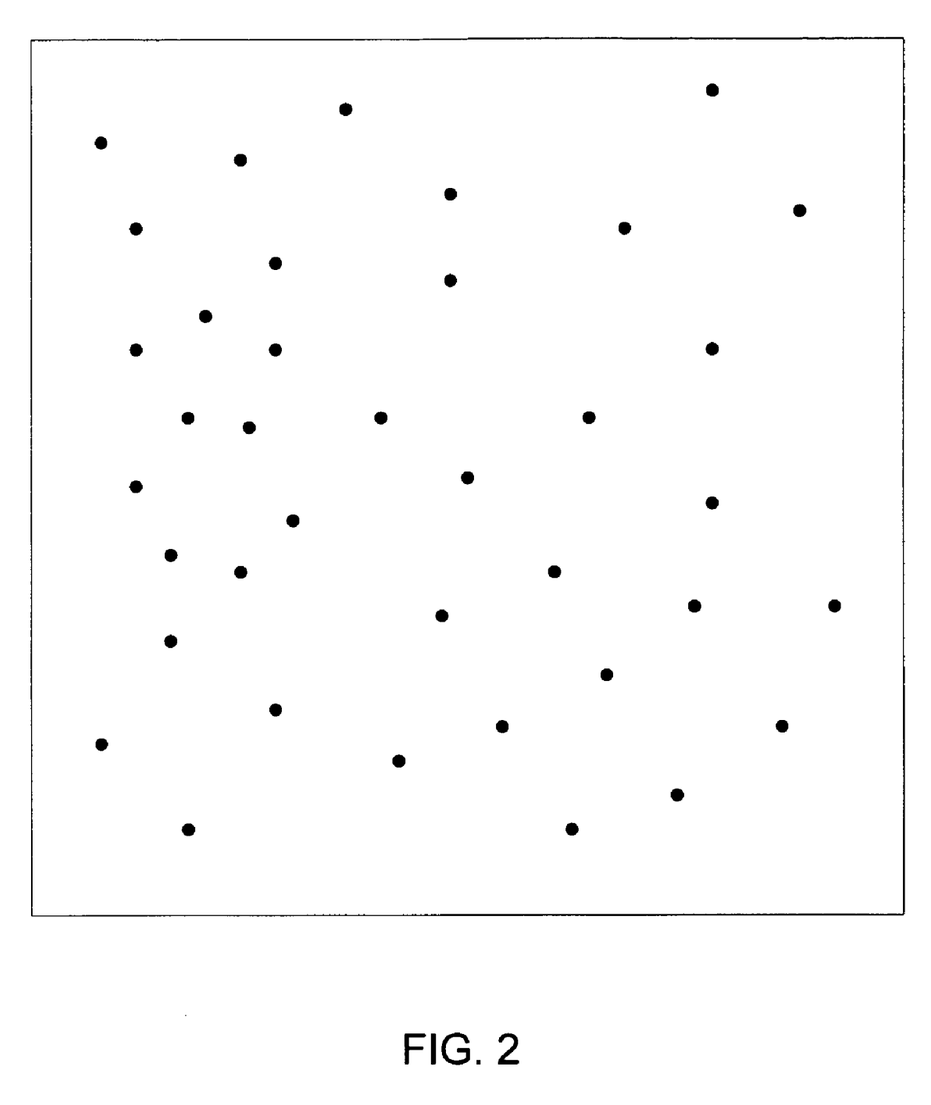
FIG. 2 is a diagram illustrating an example graph.

Each data point may also be visualized as a point on a two-dimensional graph. FIG. 2 is a diagram illustrating an example graph. The proximity of data points to one another on the graph indicates the level of similarity of their vectors. In an embodiment of the present invention, these data points may be grouped into clusters of similar data points. Clustering is the classification of objects into different groups, or more precisely, the partitioning of a data set into subsets (clusters), so that the data in each subset (ideally) share some common trait—often proximity according to some defined distance measure. These clusters may then be utilized in aiding the system select appropriate applications to recommend.

One way to cluster the data points is to attempt to determine the optimum number of clusters for a given set of data points. This optimum number is known as K. One approach to performing this clustering is to perform a "divisive" technique. In a divisive technique, clusters are repeatedly split until a threshold is met. Thus, the technique could begin with a cluster that includes all data points, this cluster is then split into two clusters, which are then split into two more, etc. The threshold may be based on an absolute number of clusters (K), based on the size of the clusters, or some other factor.

Another approach is to perform an "agglomerative" technique. In an agglomerative" technique, the process begins by putting each data point in its own cluster. Then clusters are repeatedly combined until a threshold is met. Once again, the threshold may be based on an absolute number of clusters (K), based on the size of the clusters, or some other factor.

The problem with both the divisive and agglomerative techniques is that the optimal K is not known. As such, these techniques can take a lot of time/processing power, both of which may be limited. Additionally, the accuracy of the result is highly dependent on how the system decides whether to merge clusters or split clusters.

Another possible solution is to use an ISODATA technique. In this technique, the standard deviation of the points of each cluster is examined. If it is bigger than a certain threshold, then the system attempts to split the cluster. If the standard deviation is smaller than the threshold, the system attempts to combine the cluster with another cluster. This process is then iterated until a steady-state is achieved. This solution, however, suffers from drawbacks of its own. There is still a need to set the thresholds at a certain value. Here, thresholds need to be set for the standard deviation and also the minimum distance in a cluster. These can be very difficult to set for certain types of data, such as usage data.

In an embodiment of the present invention, heuristic thresholds are utilized along with a merge-split approach in order to cluster the data points in an effective and efficient manner. Here, K cluster centroids are initialized randomly, where K can be set by a designer or obtained using any method known in the art (such as gap analysis or autoclass). Initial clusters are then formed. These initial clusters may be formed using any type of clustering algorithm. In one example, K-means is used to form these initial clusters. The clustering algorithm, however, is only used to form the initial clusters. During the clustering process, a standard distance measure such as the Euclidean distance can be used for combining the data points into initial clusters.

Then the similarity of the application usage patterns in the initial clusters may be compared. To distinguish similar clusters from dissimilar ones, a threshold may be utilized. One example threshold would be that if the average usage values of an item in two clusters differs by less than 5%, then the two clusters are similar. If a Euclidean distance is used for measuring distance, the threshold in this case will be (0.0025*n), wherein n is the number of items.

If there are no similar clusters, then the process may stop. Otherwise, the clusters that have similar item usages are merged. These new clusters are then stored in cluster storage.

For the rest of the clusters (the ones that were dissimilar to each other), the system test whether the clusters can be further divided. This may be accomplished by first dividing each of these clusters into two temporary split-clusters. The similarity between them may then be computed using the item portion of the cluster centroids and via the same technique described above for using a threshold. If the two temporary split-clusters are similar, then the original cluster is not split and instead it is added to cluster storage. For temporary split-clusters that are not similar, these may be saved as permanent clusters in cluster storage.

The entire process, beginning with the comparing of the similarity of clusters, may then be repeated using the clusters in cluster storage.

Figure 3:
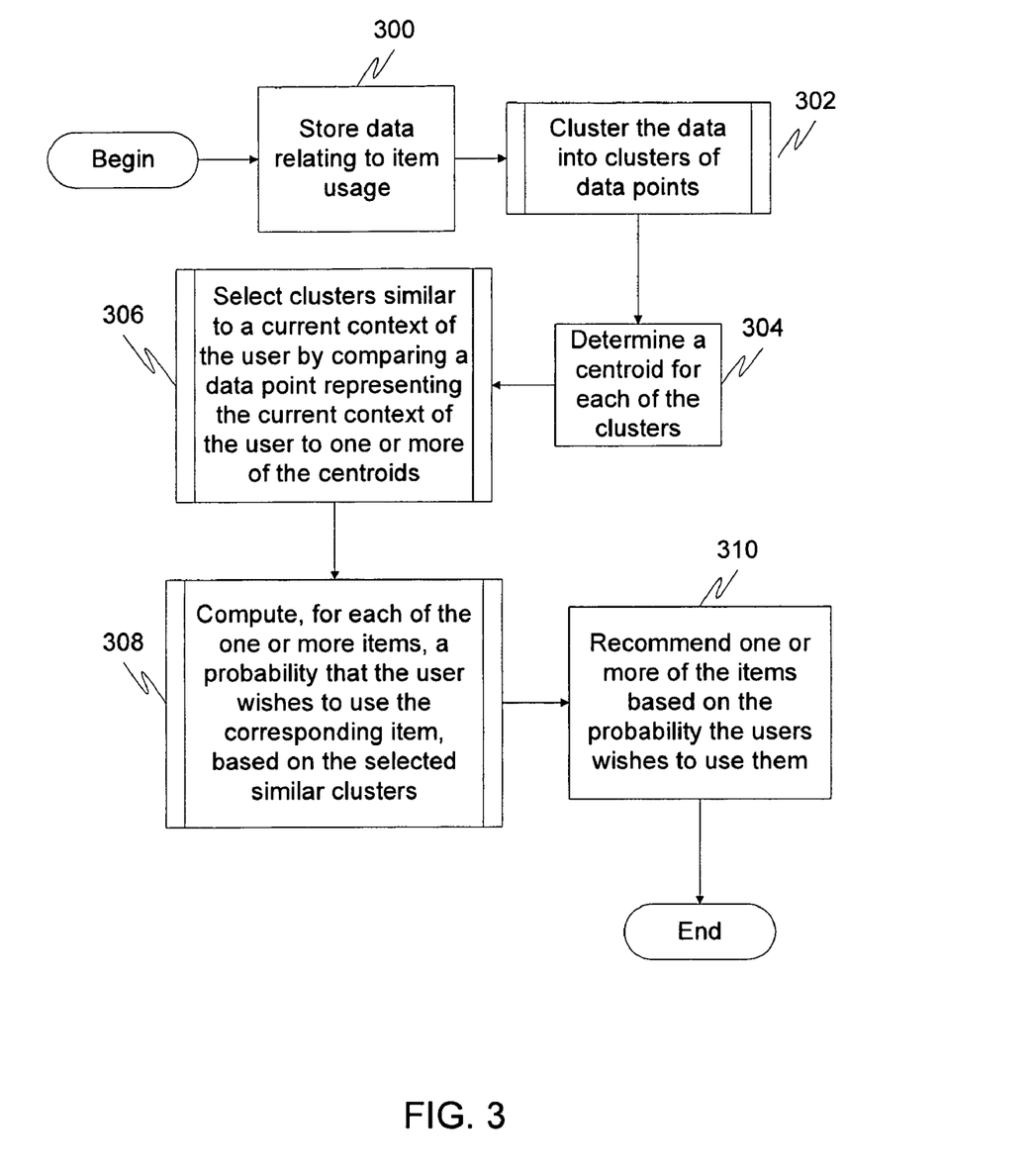
FIG. 3 is a flow diagram illustrating a method for making recommendations to a user in accordance with an embodiment of the present invention.

FIG. 3 is a flow diagram illustrating a method for making recommendations to a user in accordance with an embodiment of the present invention. Each step in this method may be embodied in hardware, software, or any combination thereof. The user may be utilizing an electronic device. This device may be a stationary device, such as a desktop computer, or may be a mobile device, such as a mobile phone, PDA, or laptop computer. One of ordinary skill in the art will recognize that other types of devices may be used with the present invention, and that nothing in this document shall be interpreted as limiting the device to any particular implementation.

At step 300, data relating to item usages of the user is stored. This data includes information as to items which were used by the user and the context in which they were used. The items may include any items that the user may find getting recommendations on as helpful. In one embodiment of the present invention, the items may include software applications running on the device. Thus, the user may find it helpful to receive recommendations on other, perhaps non-running, applications so that the user does not download, install, or run applications that have only a low probability that the user may be interested in them. In another embodiment of the present invention, the items may include computing services. This may include, for example, applications that run on other devices, such as remote games, diagnostic services, or anti-virus services. In another embodiment of the present invention, the items may include other information, for example, movies, web sites, music, etc. One of ordinary skill in the art will recognize that many different types of objects may be recommended using various embodiments of the present invention. This usage data may be stored in, for example, vectors. The vectors may contain contexts concatenated with application usage values.

Figure 4:
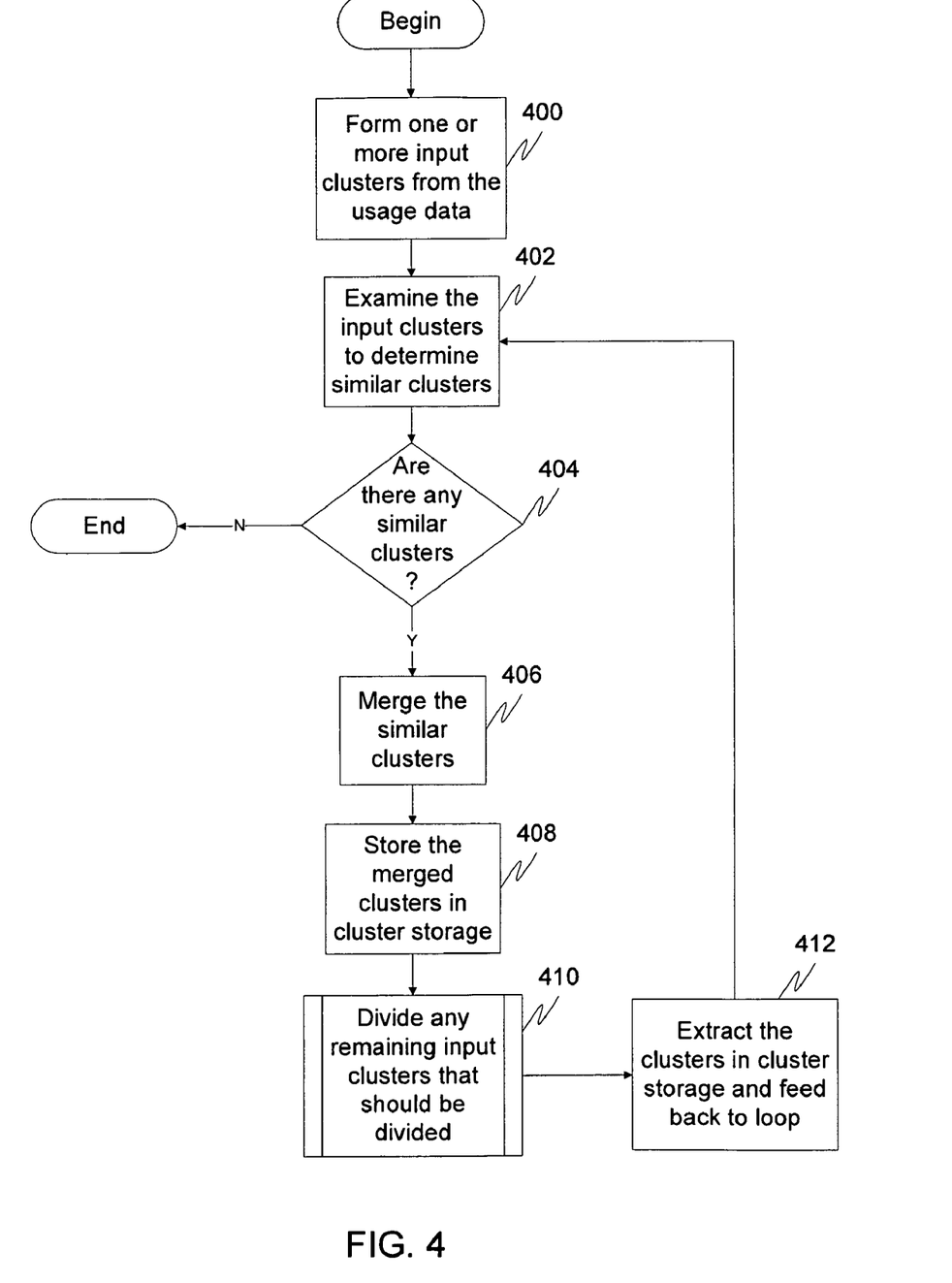
FIG. 4 is a flow diagram illustrating clustering data points in accordance with an embodiment of the present invention.

At step 302, the data is clustered into clusters of data points. This step is described in more detail in FIG. 4. FIG. 4 is a flow diagram illustrating clustering data points in accordance with an embodiment of the present invention. Each step in FIG. 4 is performed in hardware, software, or any combination thereof.

At 400, one or more input clusters are formed from the usage data. As described above, a number of different clustering techniques may be utilized in order to derive the initial set of clusters. In one such embodiment, K-means is used to form the initial clusters. At 402, the input clusters are examined to determine similar clusters. For input clusters, two clusters may be considered to be similar to each other if they have usage values for a particular item within a certain percentage of each other.

At 404, it is determined if there are any similar clusters in the input clusters. If not, then the process ends. If there are similar clusters, however, at 406 the similar clusters are merged. At this point, any clusters that were considered to be similar are removed from the set of input clusters. It should be noted that this removal may be either actual or abstract. In other words, the system may actually be maintaining a data structure that indicates the current input clusters. If that is the case, then the data structure is modified to remove the clusters that are similar. However, embodiments are possible wherein the system simply performs the process without tracking which clusters are input clusters (i.e., the process itself dictates which clusters are input clusters without a need to reference a data structure). In such a case, the removal simply means that the clusters called "input clusters" from this point on shall be deemed not to include the similar clusters. These merged clusters are then stored in a cluster storage at 408.

Figure 5:
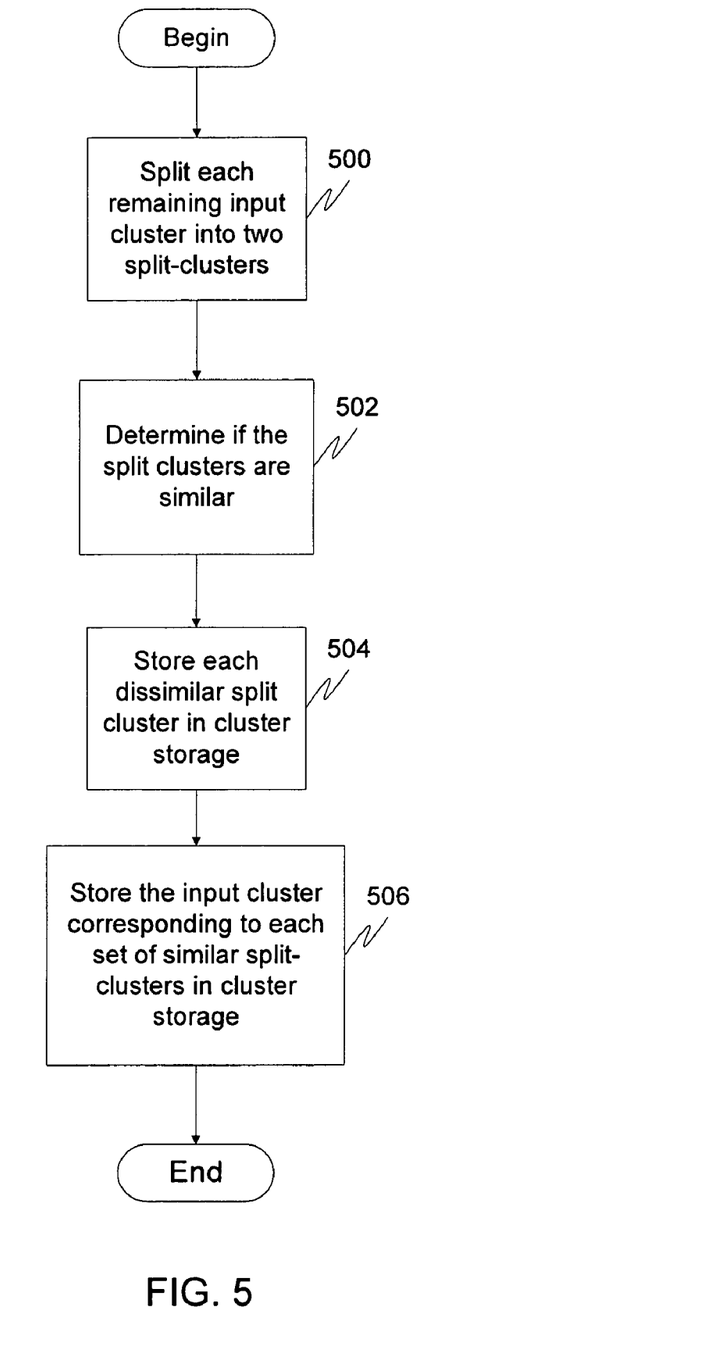
FIG. 5 is a flow diagram illustrating a method for dividing any remaining input clusters that should be divided.

At 410, any remaining input clusters that should be divided are divided. This step is described in more detail in FIG. 5. FIG. 5 is a flow diagram illustrating a method for dividing any remaining input clusters that should be divided. Each step in this method may be performed in hardware, software, or any combination thereof. At 500, each remaining input cluster is split into two split-clusters. This may be done using any clustering technique, for example, K-means, co-clusters, hierarchical clustering, etc. At 502, for each of the split-clusters, it may be determined if the split-clusters are similar. This computation may be performed in a similar manner as the one in 402 above. At 504, each dissimilar split-cluster is stored in cluster storage. At 506, the input cluster corresponding to each set of similar split-clusters is stored in cluster storage.

Referring back to FIG. 4, the clusters in the cluster storage are extracted and fed back to step 402 as input clusters.

In a modified embodiment of the present invention, at 400, when the initial clustering is performed, an initial split of the cluster may be performed before performing a merge. Thus, each initial cluster may be split into two-sub clusters. For each divided sub-cluster, the techniques in 402 may be utilized to compare the item usage similarity between them. If they are similar, then the initial cluster will not be formally divided. However, if they are not similar, the initial cluster is divided into two input clusters and saved in the cluster storage. This may be recursively performed until each of the initial clusters cannot be further divided. These revised clusters then become the input clusters to 402. Thus, in this embodiment, a split is performed first wherein in the previously described embodiment a merge is performed first.

The actual clustering may be accomplished using a variety of clustering techniques. In one embodiment, k-means clustering may be utilized. In k-means clustering, a system assigns each point to the cluster whose centroid is nearest. Thus, this procedure becomes:

(1) Randomly generate k clusters and determine the cluster centers, or directly generate k random points as cluster centers.
(2) Assign each point to the nearest cluster center.
(3) Recompute the new cluster centers.
(4) Repeat the two previous steps until some convergence criterion is met (usually that the assignment hasn't changed).

The main advantages of using k-means clustering are its simplicity and speed which allows it to run on large datasets. Its disadvantage is that it does not yield the same result with each run, since the resulting clusters depend on the initial random assignments. It minimizes intra-cluster variance, but does not ensure that the result has a global minimum of variance.

Another possible clustering technique is the use of co-clustering. Given a multi-dimensional data matrix, co-clustering refers to simultaneous clustering along multiple dimensions. Thus, for example, not only the objects are clustered but also the features of the objects, i.e., if the data is represented in a data matrix, the rows and columns are clustered simultaneously. In a two-dimensional case it is simultaneous clustering of rows and columns, in contrast to clustering along a single dimension. Co-clustering has the advantage of handling sparse data points better.

Yet another possible clustering technique is vector quantization. Vector quantization is a technique borrowed from signal processing that allows the modeling of probability density functions by the distribution of prototype vectors. It works by dividing a large set of points (vectors) into groups having approximately the same number of points closest to them. Each group is represented by its centroid point, as in k-means and some other clustering algorithms.

A simple training algorithm for vector quantization is:
1. Pick a sample point at random
2. Move the nearest quantization vector centroid towards this sample point, by a small fraction of the distance
3. Repeat A more sophisticated algorithm reduces the bias in the density matching estimation, and ensures that all points are used, by including an extra sensitivity parameter:
1. Increase each centroid's sensitivity by a small amount
2. Pick a sample point at random
3. Find the quantization vector centroid with the smallest <distance-sensitivity>
   1. Move the chosen centroid toward the sample point by a small fraction of the distance
   2. Set the chosen centroid's sensitivity to zero 4. Repeat The density matching property of vector quantization is powerful, especially for identifying the density of large and high-dimensioned data. Since data points are represented by the index of their closest centroid, commonly occurring data have low error, and rare data high error.

One of ordinary skill in the art will recognize that there are other clustering techniques that can be used in the present invention. Nothing in this document shall be construed as requiring the use of any particular clustering technique.

At step 304, a centroid is determined for each of the clusters. As described above, this involves computing the mean of data points within each of the clusters. Since, however, the clusters have been chosen so as to ensure compactness, the centroids of each cluster will wind up being fairly close to, and thus an excellent representation of, each of the data points within the cluster.

At step 306, clusters similar to a current context of the user are selected by comparing a data point representing the current context of the user to one or more of the centroids. In one embodiment of the present invention, the data point is compared to the centroids of each of the clusters. This comparison may include a series of steps. These steps are described in FIG. 6. It should be noted that the term "similar" with respect to the similarity of clusters to a context may be interpreted differently than the term "similar" with respect to the similarity of clusters to each other. The similarity of cluster to a context may be determined by, as will be described in more detail below, finding the closest centroids to a particular data point. However, as described above, the similarity of clusters to each other may be determined by examining a particular item's usage values and finding out if they are within a certain percentage of each other.

Figure 6:
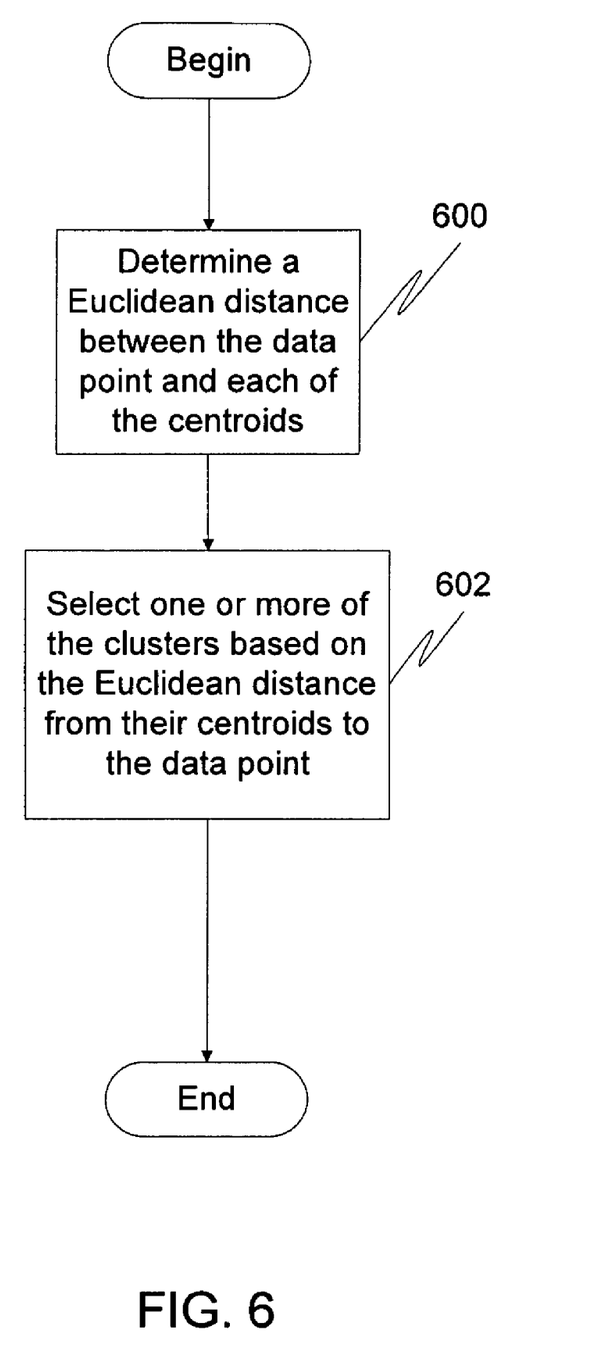
FIG. 6 is a flow diagram illustrating a method for selecting clusters similar to a current context of a user by comparing a data point representing the current context of the user to one or more of the centroids in accordance with an embodiment of the present invention.

FIG. 6 is a flow diagram illustrating a method for selecting clusters similar to a current context of a user by comparing a data point representing the current context of the user to one or more of the centroids in accordance with an embodiment of the present invention. Each step of this method may be embodied in software, hardware, or any combination thereof. At 600, a Euclidean distance between the data point and each of the centroids may be determined. Various techniques exist for quickly and efficiently computing the Euclidean distance between data points. Such techniques are outside the scope of this disclosure, but one of ordinary skill in the art will recognize that any such technique may be utilized.

At 602, one or more of the clusters may be selected based on the Euclidean distance from their centroids to the data point. The closest centroids to the data point represent the most similar clusters to the data point. How many of these closest clusters are selected may be determined by utilizing a pre-set maximum for the number of data points to be collected. For example, a system administrator may indicate a maximum of 30 data points for similar clusters. If each cluster has 10 data points, then the system may select the three clusters having the closest centroids to the data point representing the current context of the user.

Referring back to FIG. 3, once the one or more similar clusters have been selected, at 308 the system computes, for each of one or more items, a probability that the user wishes to use the corresponding item, based on the selected similar clusters. One of ordinary skill in the art will recognize that this may be accomplished in many different ways. One way is to compute a centroid vector of the data points in the selected clusters. The centroid vector then represents the probability of usage pattern for each item. At step 410, one or more of the items may be recommended based on the probability the user wishes to use them. The number of items to recommend may be determined in a number of different ways. In one embodiment, the system recommends x items having the highest probability that the user wishes to use them, wherein x is dynamically determined by using the average number of items that have been used in the selected clusters. In another embodiment of the present invention, x is simply a preset value selected by an administrator.

It should be noted that the computing and recommending steps would typically be performed only for items that are not currently being used by the user—the thought being that a user does not typically need a recommendation on an item to use if the user is already using it. However, there may be circumstances where it is beneficial to recommend an application to a user that is already being used. As such, nothing in this application shall be construed as limiting the recommendations to non-running items or items otherwise not being used, unless language is presented explicitly stating so.

It should also be noted that, in order to increase computing efficiency, it may be desirable to perform some of the steps of the method of FIGS. 3-6 during a device's idle time (offline). More specifically, in instances where the user's device is not being used or is lightly used, it becomes beneficial to perform some of the operations described above to maximize the availability of a processor of the user's device and to reduce the response time when the actual recommendation is requested (online).

Many of the steps involved in the gathering and clustering of the data itself can be performed while offline.

In another embodiment of the present invention, the probability-based solution described above may be combined with other techniques to improve the recommendation process. For example, a solution based on user-selected preferences was previously described in this document. While such a solution is very limited when utilized alone, if such a preference-based solution were combined with the probability-based solution described above, it may act to improve upon either solution operated alone. Such a solution might involve, for example, weighting the probabilities determined for a given context based upon the user preferences. For example, in a previously presented example, the probability that the user might wish to run a word processing application while at work and in the morning was listed at 0.89. However, perhaps this particular user prefers to play game applications while at work in the morning, because the user's boss does not come into work until the afternoon. If the user indicated that fact by providing a preference for game applications, the probability that the user might wish to run a word processing application may be reduced (or the probability that the user might wish to run a game application may be increased) by a weighting. In another embodiment of the present invention, the preferences may even be granularized to the same level as the tracked contexts, such that the user could expressly indicate a fondness for game applications while at work and during the mornings.

In an alternative combination of the probability-based solution and preference-based solution, the system may be designed to simply use the preference-based solution or a combination of the preference and probability-based solutions when preferences are indicated by a user, but to simply use the probability-based solution where no preferences are indicated. This allows preference-based information to still be utilized even when a large number of the users elect not to specify preferences, or where a user wishes to provide preferences for certain contexts but not others.

Figure 7:
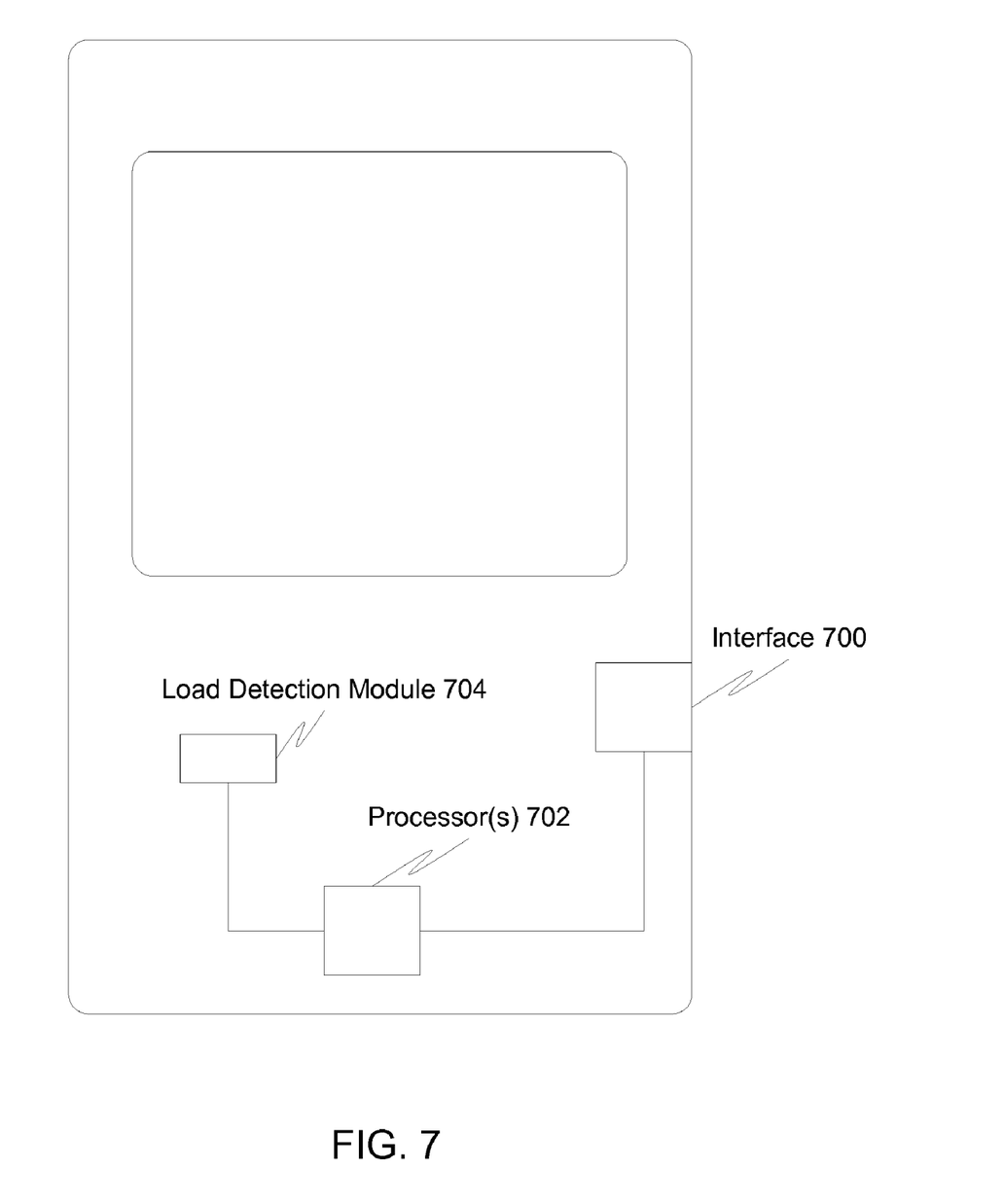
FIG. 7 is a block diagram illustrating a system in accordance with an embodiment of the present invention.

FIG. 7 is a block diagram illustrating a system in accordance with an embodiment of the present invention. In this diagram the system is a mobile device. One of ordinary skill in the art will recognize, however, that the system may be embodied in many different devices or in groups of devices. For example, the system may comprise a mobile device having a processor that performs some of the recited steps and also comprise a server that performs other of the recited steps. In another example, the system may comprise a desktop computer.

The system may include an interface 700 and one or more processors 702. The processors may be configured to perform some or all of the steps recited in FIGS. 3-6 and the corresponding text above. Additionally, when the system includes a mobile device, it may include a load detection module 704. The load detection module may detect the load level of processor 702 (i.e., how busy the processor is). In such a case, the one or more processors may then be configured to perform the storing, and clustering, and determining when the device is not being used or is lightly used and to perform the selecting, computing, and recommending when the actual recommendation is requested by a user (i.e., in an "offline" mode) and to perform the selecting, computing, and recommending when the wireless communication component is in communication with the network. (i.e., in an "online" mode).

Figure 8:
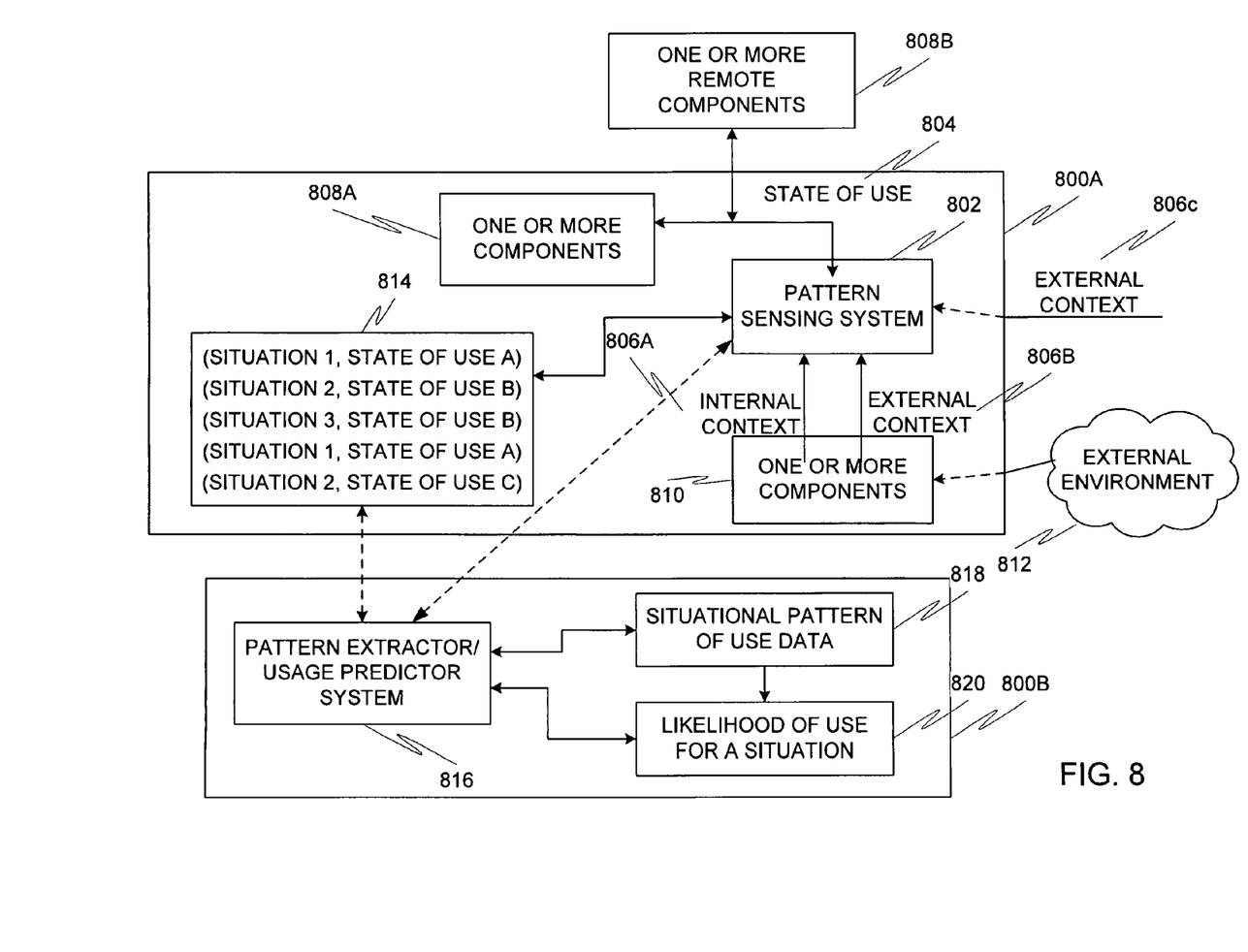
FIG. 8 depicts computing systems and in accordance with various embodiments of the invention.

FIG. 8 depicts computing systems 800A and 800B in accordance with various embodiments of the invention. Those skilled in the art will appreciate that the computing systems 800A and/or 800B can, for example, be a computing device that includes one or more processors and memory (not shown). The computing system 800A effectively includes a pattern sensing system 802 adapted for and/or capable of obtaining a state (or status) of user 804 and/or contextual information (context) 806.

In one embodiment, computing system 800A may be a mobile device and computing system 800B may be a server. However, this is merely one example of what form these computing devices may take, and is not intended to be limiting.

Typically, the state of use 804 is associated with and can be determined based on the state (or status) of one or more components 808 of the computing system 800A. The components 808 can include internal (808A) and remote (808B) components. The one or more components 808 can, for example, be one or more operational and/or executable components and/or usable components (e.g., one or more application programs being executed on the computing system 800A).

Similarly, the context 806 obtained by the pattern sensing system 802 can be associated and/or determined by or based on one or more components 810. As such, the component(s) 808 can be the same as the component(s) 810 or one or more different components. Generally, the pattern sensing system 802 obtains a context (e.g., a context of use) for the computing system 800A which can represent a situation for the computing system 800A. The context can be determined based on various internal and external factors including the state of use of one or components 808A. By way of example, the one or more components 810 can determine (e.g., measure) one or more factors, elements or variables associated with an external environment 812 and provide them to the pattern sensing system 802. As another example, internal context 806a representing the context of use of the computing system 800A may also be determined by and/or based on one or more components 808 A and/or 810 and provided to the pattern sensing system 802. It should be noted that external context 806c can also be received, for example, directly from one or more other external components (not shown) and processed by the pattern sensing system 802. As such, the context of use of one or more components 808 and/or 810 and other context information 806 can both be considered by the pattern sensing system 802 in determining a situation.

In any case, the pattern sensing system 802 processes the state of use information 804 and contextual information 806 in order to generate integrated state and contextual usage data 814. It will be appreciated that the pattern sensing system 802 can effectively represent the contextual information 806 as the situation associated with the state of use 804. As such, the integrated state and contextual usage data 814 can effectively include a set of situations (e.g., situation 1, situation 2, and situation 3) with their respective (or associated) state of use (e.g., state of use A, state of use B, state of use C). By way of example, the integrated state and contextual usage data 814 can effectively indicate that in a first situation, (situation 1), the computing system 800A has been in a first state of use (state of use A), and so on. As result, the integrated state and contextual usage data 814 allows determining a pattern of use for the computing system 800A based on the association of a state of use with a particular situation in which the state of use has been effectively observed.

More particularly, the pattern extractor/usage predictor system 816 can effectively obtain the integrated state and contextual usage data 814 in order to determine the situational pattern of use data 818 based on the association of the state of use and the situation in which the use has been observed. It will be appreciated that the pattern extractor/usage predictor system 816 can use the situational pattern of use data 818 for many applications. By way of example, the situational pattern of use data 818 can be used to determine the likelihood of use 820 of the computing system 800A for a particular situation. As such, the likelihood of use 820 can, for example, effectively indicate the probability of the computing system 800A being used in a particular situation (e.g., situation 2) in accordance with a particular state of use (e.g., state of use C).

Those skilled in the art will readily appreciate that the pattern sensing system 802 and pattern extractor/usage predictor system 816 can be combined and provided for a single computing system (e.g., a computing device). In other words, a single computing system can effectively determine the integrated state and contextual usage data 814 and use it to extract the situational pattern of use data 818 for a variety of applications including determining the likelihood of use 820. It should also be noted that the pattern sensing system 802 can be in communication with the pattern extractor/usage predictor system 816. As such, the pattern sensing system 802 can effectively communicate the integrated state and contextual usage data 814. In addition, the pattern extractor/usage predictor system 816 can effectively provide feedback to the pattern sensing system 802, for example, based on the situational pattern of use data 818 and/or the likelihood of use 820, in order to, for example, affect the information gathered by the pattern sensing system 802 including the state of use 804 and contextual information 806.

The pattern extractor/usage predictor system 816 can, for example, determine a pattern of use based on the frequency of occurrence of one or more states of use with respect to one or more situations. It will be appreciated that there is no need to provide the computing system 800A or 800B with supervised training in order to determine a pattern of use (e.g., pattern of use of the computing system 800A). Further, it will be appreciated that the situations effectively represented by the integrated state and contextual usage data 814 need not be predefined prior to their occurrence. In other words, situations can be defined as they occur. As such, the pattern of use data 818 can, for example, be used in a dynamic manner to define and/or affect the information being obtained. Similarly, states of use need not be predefined prior to their occurrence. As a result, the computing systems 800A and 800B can readily adapt to new uses (e.g., new applications) and situations, as well as a change in usage (e.g., a change with respect to applications that are frequently used, use of a device by a different user or a user with different habits) and/or change in situations associated with the use of the computing system (e.g., using a device that has been used in an office at home, moving to a different geographical location).

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for making recommendations to a user, the method comprising:
    storing data relating to usage patterns of the user, wherein the data includes information as to items which were used and the context in which they were used, wherein context includes a situation in which the user and device were operating when the items were used;
    randomly initializing a set number of cluster centroids;
    performing an initial clustering algorithm to cluster the data into input clusters of data points based upon the cluster centroids;
    performing a merge-split clustering algorithm on the input clusters, wherein the merge-split clustering algorithm comprises:
        determining if there are any input clusters that are similar to each other;
        merging the similar clusters if there are any input clusters similar to each other:
        dividing any non-merged input clusters into split clusters if the split clusters would not be similar to each other; and
        repeating the determining, merging, and dividing using the merged, divided, and remaining unmerged and undivided clusters as input clusters.

2. The method of claim 1, wherein the merge-split clustering algorithm further comprises not repeating the determining, merging, and dividing if there are no input clusters that are similar to each other.

3. The method of claim 1, wherein the dividing is performed before the determining and the merging.

4. The method of claim 1, further comprising:
    determining a centroid for each of the input clusters;
    selecting clusters similar to a current context of the user by comparing a data point representing the current context of the user to one or more of the centroids;
    computing, for each of one or more items, a probability that the user wishes to use the corresponding item, based on the selected similar clusters; and
    recommending one or more of the items having based on the probability that the user wishes to use them.

5. The method of claim 1, wherein the performing an initial clustering algorithm is performed using a K-means technique.

6. The method of claim 1, wherein the performing an initial clustering algorithm is performed using a co-clustering technique.

7. The method of claim 1, wherein the performing an initial clustering algorithm is performed using a hierarchical technique.

8. The method of claim 1, wherein the context includes the user's location.

9. The method of claim 1, wherein the user is operating a mobile device.

10. The method of claim 1, wherein the context includes a time of day in which the items were used by the user and device.

11. The method of claim 1, wherein the context includes a location in which the items were used by the user and device.

12. An apparatus comprising:
    an interface; and
    one or more processors configured to:
        store data relating to usage patterns of the user, wherein the data includes information as to items which were used and the context in which they were used;
        randomly initialize a set number of cluster centroids;
        perform an initial clustering algorithm to cluster the data into input clusters of data points based upon the cluster centroids;
        perform a merge-split clustering algorithm on the input clusters, wherein the merge-split clustering algorithm comprises:
            determining if there are any input clusters that are similar to each other;
            merging the similar clusters if there are any input clusters similar to each other:
            dividing any non-merged input clusters into split clusters if the split clusters would not be similar to each other; and
            repeating the determining, merging, and dividing using the merged, divided, and remaining unmerged and undivided clusters as input clusters.

13. The apparatus of claim 12, wherein the apparatus is a mobile device.

14. A system for making recommendations to a user, the system comprising:
    means for storing data relating to usage patterns of the user, wherein the data includes information as to items which were used and the context in which they were used, wherein context includes a situation in which the user and device were operating when the items were used;
    means for randomly initializing a set number of cluster centroids;
    means for performing an initial clustering algorithm to cluster the data into input clusters of data points based upon the cluster centroids;
    means for performing a merge-split clustering algorithm on the input clusters, wherein the merge-split clustering algorithm comprises:
        determining if there are any input clusters that are similar to each other;
        merging the similar clusters if there are any input clusters similar to each other:
        dividing any non-merged input clusters into split clusters if the split clusters would not be similar to each other; and
        repeating the determining, merging, and dividing using the merged, divided, and remaining unmerged and undivided clusters as input clusters;
    a computer processor configured to interact with the means for storing, means for performing an initial clustering algorithm, and means for performing a merge-split algorithm and to perform calculations based on input therefrom, providing results.

15. The system of claim 14, wherein the context includes a time of day in which the items were used by the user and device.

16. The system of claim 14, wherein the context includes a location in which the items were used by the user and device.

17. A non-transitory storage device readable by a machine tangibly embodying a program of instructions executable by the machine to perform a method for making recommendations to a user, the method comprising:
- storing data relating to usage patterns of the user, wherein the data includes information as to items which were used and the context in which they were used, wherein context includes a situation in which the user and device were operating when the items were used;
- randomly initializing a set number of cluster centroids;
- performing an initial clustering algorithm to cluster clustering the data into input clusters of data points based upon the cluster centroids;
- performing a merge-split clustering algorithm on the input clusters, wherein the merge-split clustering algorithm comprises:
- determining if there are any input clusters that are similar to each other; merging the similar clusters if there are any input clusters similar to each other:
- dividing any non-merged input clusters into split clusters if the split clusters would not be similar to each other; and
- repeating the determining, merging, and dividing using the merged, divided, and remaining unmerged and undivided clusters as input clusters.

18. The non-transitory storage device of claim 17, wherein the context includes a time of day in which the items were used by the user and device.

19. The non-transitory storage device of claim 17, wherein the context includes a location in which the items were used by the user and device.

* * * * *